H. L. BRIGGS.
TOOL DRIVING ATTACHMENT FOR AUTOMOBILES.
APPLICATION FILED NOV. 12, 1915.
1,190,854.
Patented July 11, 1916.
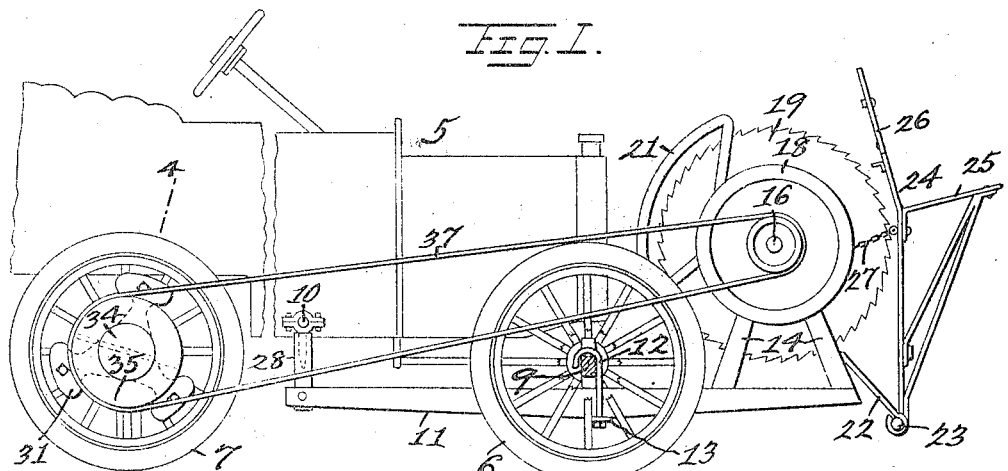
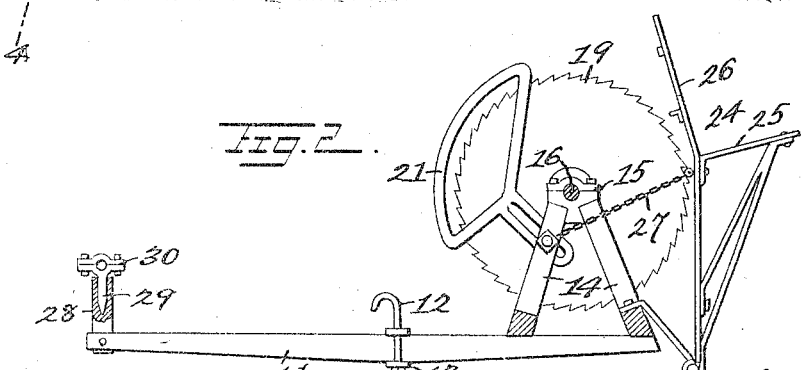
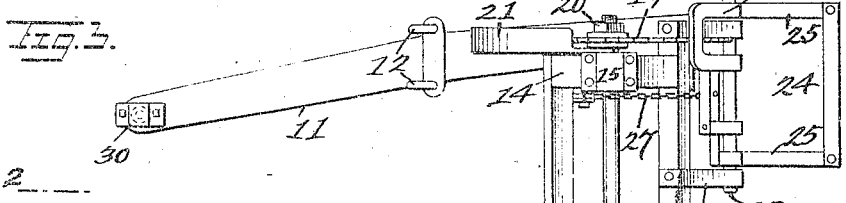
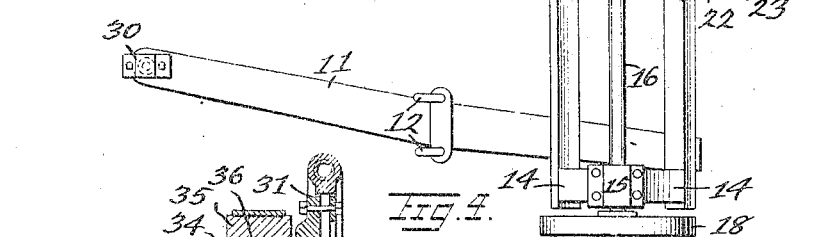
WITNESSES
H. J. Walker
J. C. Larsen
INVENTOR
H. L. Briggs
BY
ATTORNEYS

500
UNITED STATES PATENT OFFICE.

HENRY L. BRIGGS, OF SALEM, OREGON.

TOOL-DRIVING ATTACHMENT FOR AUTOMOBILES.

1,190,854.

Specification of Letters Patent.

Patented July 11, 1916.

Application filed November 12, 1915. Serial No. 61,079.

*To all whom it may concern:*

Be it known that I, HENRY L. BRIGGS, a citizen of the United States, and a resident of Salem, in the county of Marion and State of Oregon, have invented certain new and useful Improvements in Tool-Driving Attachments for Automobiles, of which the following is a specification.

My invention relates to saws or other rotative devices, and the main object thereof is to provide the same as an attachment to automobiles, without any structural change in the latter, whereby the power for the saw or the like will be obtained from the automobile motor.

In order to accomplish this result I provide a pulley as an attachment for one of the driving wheels of the automobile which may be quickly and easily installed or removed and which does not interfere with the normal operation of the automobile.

My invention is fully described in the following specification, of which the accompanying drawings form a part, in which like characters refer to like parts in each of the views, and in which:—

Figure 1 is a side view of the front and rear portions of an automobile provided with my invention, used as a saw; Fig. 2 is a sectional view of my invention detached from the automobile, taken on the line 2—2 of Fig. 3; Fig. 3 is a top plan view thereof; and Fig. 4 is a section taken on the line 4—4 of Fig. 1.

In the drawings forming a part of this application I have shown, fragmentarily, an automobile 5 of the Ford type but which may be of any type having front wheels 6, rear wheels 7, driving axle 8, front axle 9, and control shaft 10 to which the foot pedals are connected, although not shown.

The saw carrying attachment consists of two sill bars 11 suspended from the front axle 9 by means of hooks 12 passed through clip washers 13 beneath the sill bars, the forward ends of said sill bars supporting uprights 14 which in turn carry bearings 15 for a shaft 16 which carries a pulley 17 and a balance wheel 18 on one end and which carries a circular saw 19 at its other end held in place by means of a nut 20.

Adjustably connected with the truss-like frame formed by the uprights 14 is a saw guard 21 and said frame carries forwardly directed brackets 22 which carry a rod 23 serving as a pivot for a wood rack or work carrier 24 having a wood table 25 and a wood rest 26, this rack being limited in its forward movement by means of a chain 27 of adjustable type. The rear end of each sill bar 11 carries a vertical tube 28 adapted to receive a pin 29 forming part of a bearing box 30 clamped loosely on the control shaft 10, these boxes being left in position at all times, if desired, as they do not interfere with the normal operation of the automobile.

As shown in Figs. 1 and 4, I clamp a spider 31 to the driving wheel 7 on the side of the automobile corresponding to the position of the pulley 17 on the saw attachment, this spider being self-centering by means of a bore 32 adapted to receive the hub-box 33 of the wheel 7, and said spider 31 carries an outwardly directed hub 34 upon which a pulley 35 is mounted and secured by means of a pin 36.

In practice, assuming the boxes 30 to be in position on the control shaft 10, the saw attachment is placed upon the ground, or special stools not shown may be used to raise the same from the ground, and the automobile driven astride said attachment, from the rear thereof, into such position that the hooks 12 may be passed over the front axle 9 and the pins 29 may be entered into the respective tubes 28, the weight of the forward end of the attachment maintaining the same in place.

The rear wheel having the pulley 35 thereon is jacked up in any desired manner, a belt 37 passed over the pulleys 17 and 35, and the device is ready to be started, stopped, and controlled by the usual automobile control means, not shown. A stick of wood to be sawed, as into stove lengths, is placed upon the wood rack and manually fed rearwardly against the saw 19, the guard 21 preventing saw-dust from passing to the radiator of the automobile, and the saw operation is under quick, easy, and complete control.

My attachment may be as readily detached from the automobile, and without any injury thereto, and it will be noted that I make no holes, notches, or removals with respect to the automobile, nor do I scar, scratch, or otherwise mutilate the latter; it will also be noted that my invention can be attached to an automobile in a very few minutes, as well as detached, without putting the automobile out of commission for normal use other than for practically the time of actual sawing operation.

While I have shown my invention as a saw, I may use the same in different ways, such as for grinding, burnishing, and the like wherein a rotative tool or other device is employed, and I reserve the right to make such structural changes over the form shown and described as come within the spirit of the invention, and within the scope of the appended claims.

Having fully described my invention, what I claim as new, and desire to secure by Letters Patent, is:—

1. The combination with an automobile provided with a driving wheel, a driving axle and with a front axle; of an attachment suspended from said front axle and forming a component part of the automobile, a rotative tool carried by said attachment, and means for operatively connecting said tool with said driving wheel, said driving wheel being jacked up in the operation of said tool.

2. The combination with an automobile provided with a driving wheel, a driving axle and with a front axle; of sill bars suspended from said axle, a rotative tool carried at the forward ends of said sill bars, and means for operatively connecting said tool with said driving wheel.

3. The combination with an automobile provided with a driving wheel, a driving axle and with a front axle; of hooks depending from said axle, sill bars suspended from said hooks, a rotative tool carried at the forward ends of said sill bars, and means for operatively connecting said tool with said driving wheel.

4. The combination with an automobile provided with a driving wheel, a driving axle and with a front axle; of hooks depending from said axle, sill bars suspended from said hooks, a rotative tool carried at the forward ends of said sill bars, bearings on said automobile for the rear ends of said sill bars, and means for operatively connecting said tool with said driving wheel.

5. The combination with an automobile provided with a driving wheel, a driving axle and with a front axle; of an attachment suspended from said axle, a rotative tool carried by said attachment, a pulley carried by said driving wheel, and means for operatively connecting said tool and said pulley.

6. The combination with an automobile provided with a driving wheel and with an axle; of an attachment suspended from said axle, a rotative tool carried by said attachment, a pulley connected with said tool, a spider detachably secured to said driving wheel, a pulley carried by said spider, and a belt connecting said pulleys.

7. The combination with an automobile provided with a driving wheel, a driving axle and with a front axle; of an attachment suspended from said axle, a rotative tool carried by said attachment, a guard for said tool, a work carrier movable toward and from said tool, and means for operatively connecting said tool with said driving wheel.

In testimony whereof I have signed my name to this specification in the presence of two subscribing witnesses.

HENRY L. BRIGGS.

Witnesses:
 ROY F. SHIELDS,
 FLORA L. NEWMAN.